US012455781B2

(12) United States Patent
Vogler et al.

(10) Patent No.: US 12,455,781 B2
(45) Date of Patent: Oct. 28, 2025

(54) METHOD FOR TRANSITIONING A VEHICLE BETWEEN DIFFERENT MODES ACCORDING TO AGREEMENT AND DEVIATIONS BETWEEN TIME SIGNALS OF DIFFERENT TIME SOURCES

(71) Applicant: Robert Bosch GmbH, Stuttgart (DE)

(72) Inventors: Benjamin Vogler, Heilbronn (DE); Wilfried Feuchter, Kupferzell (DE)

(73) Assignee: ROBERT BOSCH GMBH, Stuttgart (DE)

( * ) Notice: Subject to any disclaimer, the term of this patent is extended or adjusted under 35 U.S.C. 154(b) by 36 days.

(21) Appl. No.: 18/245,593

(22) PCT Filed: Nov. 22, 2021

(86) PCT No.: PCT/EP2021/082418
§ 371 (c)(1),
(2) Date: Mar. 16, 2023

(87) PCT Pub. No.: WO2022/117379
PCT Pub. Date: Jun. 9, 2022

(65) Prior Publication Data
US 2023/0367666 A1    Nov. 16, 2023

(30) Foreign Application Priority Data

Dec. 3, 2020   (DE) ............... 10 2020 215 301.9

(51) Int. Cl.
*G06F 11/07*   (2006.01)
(52) U.S. Cl.
CPC ...... *G06F 11/0772* (2013.01); *G06F 11/0739* (2013.01); *G06F 11/0796* (2013.01)

(58) Field of Classification Search
CPC ............ G06F 11/0739; G06F 11/0772; G06F 11/0796; G06F 1/12; G06F 1/14
See application file for complete search history.

(56) References Cited

U.S. PATENT DOCUMENTS 5,036,528 A * 7/1991 Le .................. G06F 1/10
                                             331/18
6,473,866 B1 * 10/2002 Yeo ................ G06F 1/14
                                             713/400

(Continued)

FOREIGN PATENT DOCUMENTS

CA    2885776 A1 *  4/2014  .......... G01S 19/215
JP    2005156211 A   6/2005

OTHER PUBLICATIONS

"Ticks between Unix epoch and GPS epoch" by StackOverFlow https://stackoverflow.com/questions/20521750/ticks-between-unix-epoch-and-gps-epoch (Year: 2016).*

(Continued)

*Primary Examiner* — Joseph O Schell
(74) *Attorney, Agent, or Firm* — NORTON ROSE FULBRIGHT US LLP

(57) ABSTRACT

A method for providing a reliable time signal. In the method, a first time signal from a first time source and a second time signal from a second time source are received and evaluated by an arrangement, the first time source and the second time source being independent of each other, the arrangement including a first unit in the arrangement which fulfills an observer and comparator function, the two time signals are compared with each other and a detected deviation between the two time signals is evaluated, and the reliable time signal is output on the basis of this evaluation.

11 Claims, 3 Drawing Sheets

(56) References Cited

U.S. PATENT DOCUMENTS

| | | | | |
|---|---|---|---|---|
| 9,645,553 | B1* | 5/2017 | Roden, III | H04J 3/0688 |
| 2001/0016918 | A1* | 8/2001 | Alexander | G06F 1/26 |
| | | | | 713/323 |
| 2009/0063886 | A1* | 3/2009 | Arimilli | G06F 1/12 |
| | | | | 713/400 |
| 2014/0111249 | A1* | 4/2014 | Whitehead | H04J 3/0688 |
| | | | | 327/99 |
| 2017/0255224 | A1* | 9/2017 | Bowden | G06F 1/12 |
| 2019/0206153 | A1* | 7/2019 | Antoni | G07C 5/00 |
| 2019/0370668 | A1* | 12/2019 | Hiruta | G06N 5/01 |
| 2020/0064836 | A1* | 2/2020 | Zhang | G05D 1/0278 |
| 2020/0076439 | A1* | 3/2020 | Weeks | H03L 7/0805 |
| 2021/0328698 | A1* | 10/2021 | Lv | H04J 3/0667 |

OTHER PUBLICATIONS

International Search Report for PCT/EP2021/082418, Issued Mar. 4, 2022.

* cited by examiner

METHOD FOR TRANSITIONING A VEHICLE BETWEEN DIFFERENT MODES ACCORDING TO AGREEMENT AND DEVIATIONS BETWEEN TIME SIGNALS OF DIFFERENT TIME SOURCES

FIELD

The present invention relates to a method for providing a reliable time signal, in particular for safety-related applications, and to an arrangement for carrying out the method.

BACKGROUND INFORMATION

A time signal is a signal carrying the current clock time and possibly the current date as information. Increasingly, systems and software which require an absolute indication of time and date, including for safety-related functions, are being used, e.g., in electronic controls and control units, in particular in embedded systems, for example for use in the vehicle sector. These signals are used for example in conjunction with file/data storage systems indicating a date/time stamp for stored files or data, the "age" of which is relevant. This may be the case if these data are not permanently programmed in once during production but are likewise replaced or supplemented once, several times, or frequently by "newer" data over the service life.

In the durables and consumables sector (consumer goods sector), such as for example in the case of mobile phones, smartphones, PC applications, etc., it is common and conventional for the software to make available a date/clock time value, in particular through operating system routines. This clock time in this case is typically derived from corresponding operating system timers (OS timers) and/or CPU (central processing unit) clock generators. This requires the clock to be set to the real clock time once or multiple times: this can be executed by corresponding functions and commands. These software clocks may in this case either be reset each time the system is started or be supported by a real time clock (RTC module), as a result of which the clock likewise can continue to run even in the switched-off state.

It should be noted that these conventional clock timers are not sufficient for safety-related applications, since corresponding errors or incorrect settings may result in date/clock time values which are undetectedly erroneous or which are not set at all and deviate from reality. Furthermore, in this case the error source of a possible incorrect setting of the clock time, which may be accidental or possibly even intentional, for example due to security-related attacks, also comes into play, although the timer used is itself working without errors.

For safety-related functions the OS timers, clock generators and clock pulses derived therefrom, for example cyclic tasks, can be safeguarded by a redundant and independently clocked module, usually in conjunction with a watchdog. This however applies only to relative time values, e.g., of a clock pulse, with very short periods, typically 1 ms to 1 sec, and therefore with relatively large tolerances of, e.g., +/−10 or even +/−20%. As a result, these safeguarding measures are not sufficient or suitable for generating an absolute clock time signal.

Furthermore, a signal derived from a source, e.g., from a GPS (global positioning system) receiver or alternatively from an RTC module, does not offer sufficient safety. Furthermore, currently available absolute time sources are available primarily only in QM (quality management) quality or consumer quality.

SUMMARY

A method and an arrangement for providing a reliable signal are provided according to the present invention. Specific embodiments will become apparent from the disclosure herein.

The method presented according to the present invention serves for providing an absolute time signal, in particular a reliable absolute time signal, for safety-related applications. According to an example embodiment of the present invention, the method provides that a first time signal from a first time source and a second time signal from a second time source are received and evaluated by an arrangement for carrying out the present invention, with the first time source and the second time source being independent of each other. This means that the operation of the first time source has no effect on the operation of the second time source, and vice versa. The two time signals provided are thus also independent of each other, and there is no dependency between these two signals.

According to an example embodiment of the present invention, a first unit in the arrangement fulfills an observer and comparator function. This means that this first unit observes or monitors the two time signals or the data or information carried by these two time signals, which represent in particular time values, and compares them with each other. Then, a detected deviation between the two time signals is evaluated. The reliable time signal is output on the basis of this evaluation. In such case, tolerances or tolerance threshold values are taken into account.

An independent time base which is used in carrying out the observer and comparator function can be associated with the first unit. In this way, the comparison can be carried out reliably and independently of any errors transmitted with the two time signals. The observer and comparator function in one configuration is carried out cyclically, that is to say in a regularly recurring manner.

Furthermore, according to an example embodiment of the present invention, a second unit may be provided with which different formats of the data carried by the two time signals are harmonized with each other. Thus time signals can be processed independently of their formats.

According to an example embodiment of the present invention, a third unit may be provided which, in the event that the comparison results in a deviation of the two time signals which lies outside a specified tolerance, triggers an error reaction. This third unit may also output a status signal. This status signal may however also be output by the described arrangement independently of the presence of this third unit.

The method presented consequently makes it possible to overcome the lack, discussed first hereinbefore, of a reliable clock time signal in a compound system, in particular within a vehicle, by suitable measures, so that a sufficiently reliable absolute clock time signal can be made available to a safety-related application or function.

Finally, according to an example embodiment of the present invention, freezing of one of the two time sources can be detected. For example, a fourth unit may be provided for this.

With the presented method it is thus possible to generate a reliable time signal from at least two independent time sources and signals, detect corresponding errors in the time values, and execute at least one suitable error reaction.

In the case of the method of the present invention, at least in some of the variants, there is provided:
1. processing of at least two independent time signal sources,
2. a cyclically executed observer function which analyzes the time signals and detects errors,
3. and thereby provides a reliable time as a signal for utilizing functions,
4. and provides a status of the reliable time and coupling for triggering an error reaction.

In order to achieve this, in particular diverse, redundant time sources are used. These consist, firstly, of a time signal, which is provided, e.g., by a cloud server system via Wi-Fi connections. This is known for example as what is called "UTC time" (UTC: coordinated universal time), and is used accordingly in simple QM systems. Secondly, the time sources consist of an independent time signal which is received, processed, and provided by a GPS receiver module as what is called a "GPS time" signal from a GPS satellite.

Coordinated universal time is the world time which is valid today, which is utilized for indicating time everywhere where a universal uniform timescale is required.

In a further specific embodiment of the present invention, two GPS receivers which are structurally separate and redundant are used, in which case modules from different manufacturers should be used. In a further configuration, by a further independent time source such as an RTC based clock combined with a GPS receiver or a cloud server clock time value. One further variant provides for a combination of a time source mentioned above with a radio clock receiver. The latter may typically provide a universal time atomic time.

In all of the above-mentioned variants of the present invention, the time signals are available in such a way that special measures relating to safety for safeguarding or detecting errors in the signals or their transmission are typically not contained in their technology. Therefore an undetected error and corruption of the time value may occur on one time source in each case.

To detect the relevant time errors or failures, in one configuration the two time values, which are present in different representations, e.g., UTC "Universal Time Code", "GPS time", etc., in a first step are converted into a common identical type of representation. In so doing, known deviations, such as leap seconds, or counter overflows, such as for example every 1024 weeks in the GPS time format, time zones or the like are accordingly taken into account and corrected.

According to an example embodiment of the present invention, the two time signals are observed and assessed by a cyclically executed observer and comparator function. This observer function may be executed on a third and independent time base, e.g., the CPU clocking and SW implementation of the control unit. Minor deviations of both clocks, for example of a magnitude of +/−5 sec, corresponding to the inaccuracy of the signal sources and transmission paths, are tolerated as "normal". In the case of larger, and therefore erroneous, deviations, a suitable error reaction can be initiated.

The error reaction may also take place in a stepped manner and consist in that initially the last reliable time value continues to be used for a further short tolerance time, or alternatively also the dependent functions or the entire system is/are placed in a safe error state.

Furthermore, according to an example embodiment of the present invention, the observer function in one configuration also detects the freezing or ceasing to run (stuck-at error) of one or especially both clocks. In this case too, in certain circumstances a sufficiently short "stoppage" time of the clocks can be tolerated corresponding to the use of the reliable time signal. If the tolerance is exceeded, alternatively or additionally a suitable error reaction can be triggered. The observer function, therefore, in addition to the actual, now reliable, time signal, likewise delivers at least one further status signal indicating the integrity/correctness/degradation status of the time signal. Optionally, furthermore the possibility of triggering a further error reaction in the respective functions which use the time signal may exist.

In a further specific embodiment of the present invention, the observer function may likewise tolerate initial "failures" of the signal sources, which are typically initially present after the system is started up, and display them by a corresponding status condition. Thus a reliable and robust, and at the same time also secure, startup of the system is possible.

Above, and in the description of the figures, the use of a first time source and of a second time source is described. Of course, the method can also be carried out with more than these two time sources.

The arrangement presented serves to carry out the method and is implemented for example in hardware and/or software.

Further advantages and configurations of the present invention will become apparent from the description herein and the figures.

It goes without saying that the above-mentioned features and those still to be discussed below can be used not only in the combination indicated in each case, but also in other combinations or on their own, without departing from the scope of the present invention.

DETAILED DESCRIPTION OF EXAMPLE EMBODIMENTS

The present invention is illustrated schematically in the figures with the aid of specific embodiments, and will be described extensively below with reference to the figures.

Figure 1:
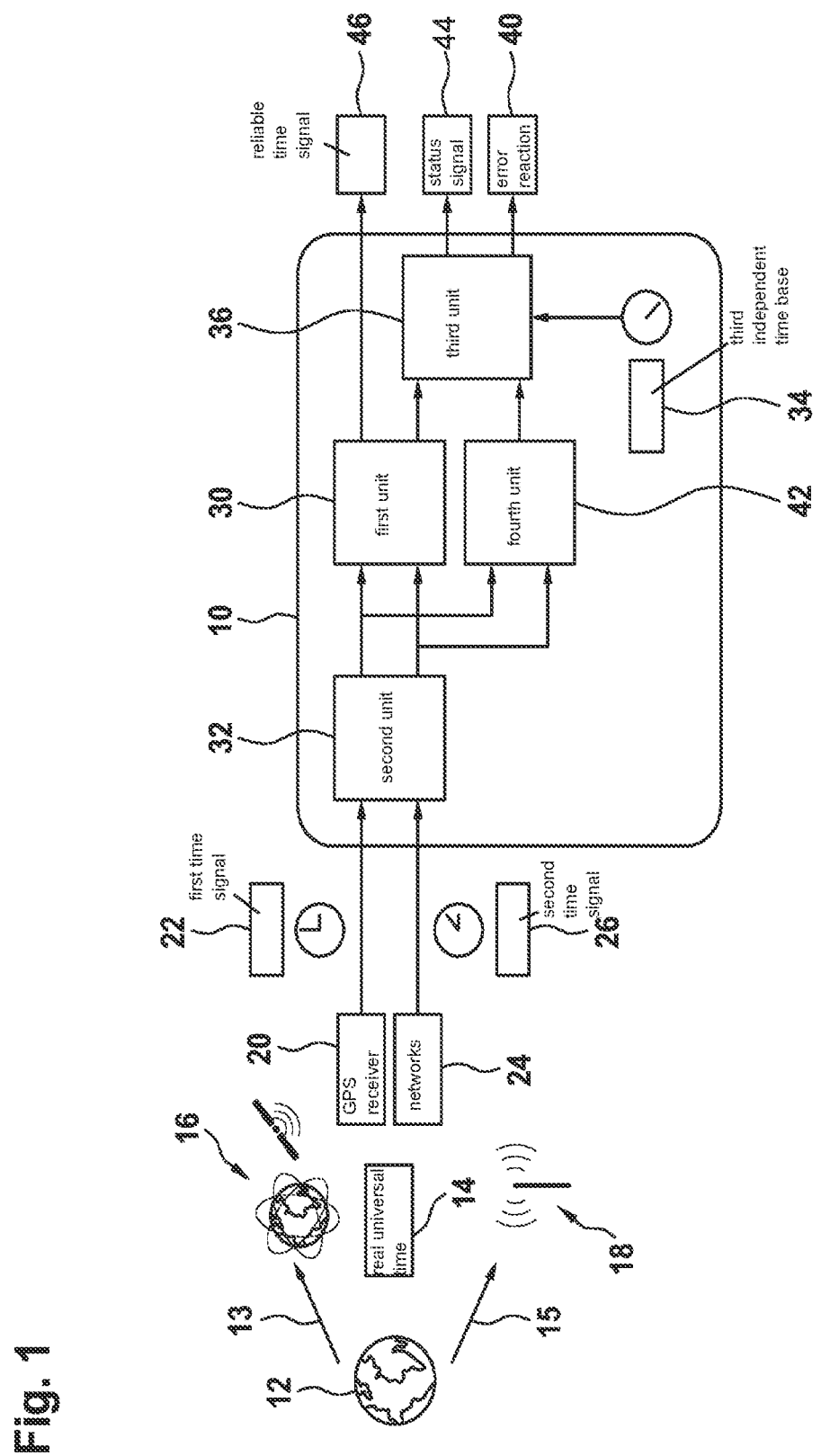
FIG. 1 shows a schematic illustration of a specific example embodiment of the arrangement for carrying out the presented method, according to the present invention.

FIG. 1 shows a schematic illustration of a specific embodiment of the arrangement for carrying out the method described herein that is denoted overall by the reference numeral 10. The illustration furthermore symbolically shows a globe 12, to which a real universal time 14 which is transmitted once via satellites 16 and, independently thereof, via radio links 18 is transmitted. Thus there is a first time source 13 and a second time source 15, which are independent of each other. This results in a first time signal 22, in this case a GPS time signal, transmitted via a GPS receiver 20, and a second time signal 26, in this case a UTC time signal, transmitted via mobile phone networks, Wi-Fi, and comparable networks 24. The two time signals 22 and 26 are input variables of the arrangement 10.

The arrangement 10 carries out an observer and comparator function. This means that the arrangement observes or monitors, in particular cyclically, the two time signals 22, 26, or the information carried by the two time signals 22, 26, and compares them with each other. For this purpose, a first unit 30 is provided which compares the two time signals 22, 26 with each other and detects deviations, with tolerances being able to be taken into account. Since in this case the two time signals 22, 26, or the time values which they transmit, are present in different representations, a second unit 32 is provided which converts the time values to a common type of representation.

An absolute time indication can be represented in different ways. The UTC's Unix time stamp, which represents the current time as a numerical value of the seconds elapsed since Jan. 1, 1970, is widely used. A time indication may however also be stored, transmitted, or agreed in "human" form as "year-month-day-hour:minute:second", in this case both as "text" or encoded by numbers in a data structure, or, as used in "GPS time", as an indication of the weeks elapsed since Jan. 6, 1980 plus the "seconds of the current week" as numerical values.

Alternatively, any unambiguous definition whatsoever of one's own representation, e.g., "seconds since 1.1.2020", may also be used. Furthermore, systematic, known deviations, for example in the form of the leap seconds, can be corrected at this point.

In the variant shown of the arrangement 30, furthermore a third independent time base 34 is provided, on the basis of which the observer and comparator function is executed. This separate time base is furthermore required in order to implement tolerance times, within which invalid deviations or the failure of one or both signals are/is briefly tolerated.

A third unit 36 triggers an error reaction 40 if detected deviations lie outside of predetermined tolerances. Furthermore, a status signal 42 is output dependent on the comparison.

Furthermore, a fourth unit 42 is provided which is provided for detecting in particular the freezing of the two time signals at a plausible pair of values 22, 26.

The first unit 30 then outputs the reliable time signal 46 dependent on the comparison of the two time signals 22, 26 which is carried out.

In principle, here, corresponding to the further use of the time indication, there may be strategies of different suitability, e.g., including the selection of the "most recent", the "oldest" value, or a defined value between these, such as a weighted mean, arithmetic mean, etc. In the present case, only the time value of a signal source for which a greater availability and accuracy is expected in normal error-free operation is always used, as long as the deviation of the two signals lies within the tolerance. In the error case of a greater deviation, the last correct time value confirmed by the comparison is retained.

If both time values match sufficiently again within a short tolerated time interval, normal error-free operation is resumed, and the current time value is again provided.

Upon starting up, first of all a plurality of valid time values are verified before switching from a defined initial value, which is always invalid and incorrect, to the current time value. The associated status in so doing changes from "initial"/"invalid" to "valid".

The described units 30, 32, 36, and 42 may be implemented as hardware modules in the arrangement, as pure software modules, or as hardware/software solutions.

Figure 2:
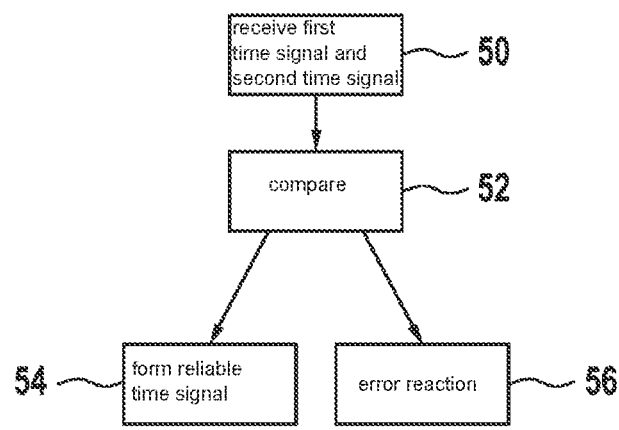
FIG. 2 shows one possible sequence of the presented method in a flow diagram, according to the present invention.

FIG. 2 shows one possible sequence of the described method in a flow diagram. In a first step 50, an arrangement for carrying out the method receives a first time signal carrying a first time value, and a second time signal carrying a second time value. In a second step 52, the two time signals or time values are compared with each other. From the result of the comparison, and taking account of tolerances, in a third step 54 the reliable time signal is formed and output together with a status signal indicating the correctness status or error status. Additionally, in a fourth step 56 an error reaction is triggered once a tolerance time has elapsed.

The specific configuration of the output signals is typically dependent on the system design. In the present design, a time together with a separate status signal is always output by this safe time function. In alternative variants, it is possible to freeze the time, set it to an invalid value, or, upon the error reaction being triggered, to terminate the provision of the time, in which case a status may possibly no longer be necessary. If no separate status signal is used, the status may also be represented by special values of time (e.g., as an "invalid value", time="−1", "−2", etc.). It should be noted that in these cases the status is relayed implicitly by the status of the safe time (invalid value, or no time provided, here interpreted as status="invalid").

Figure 3:
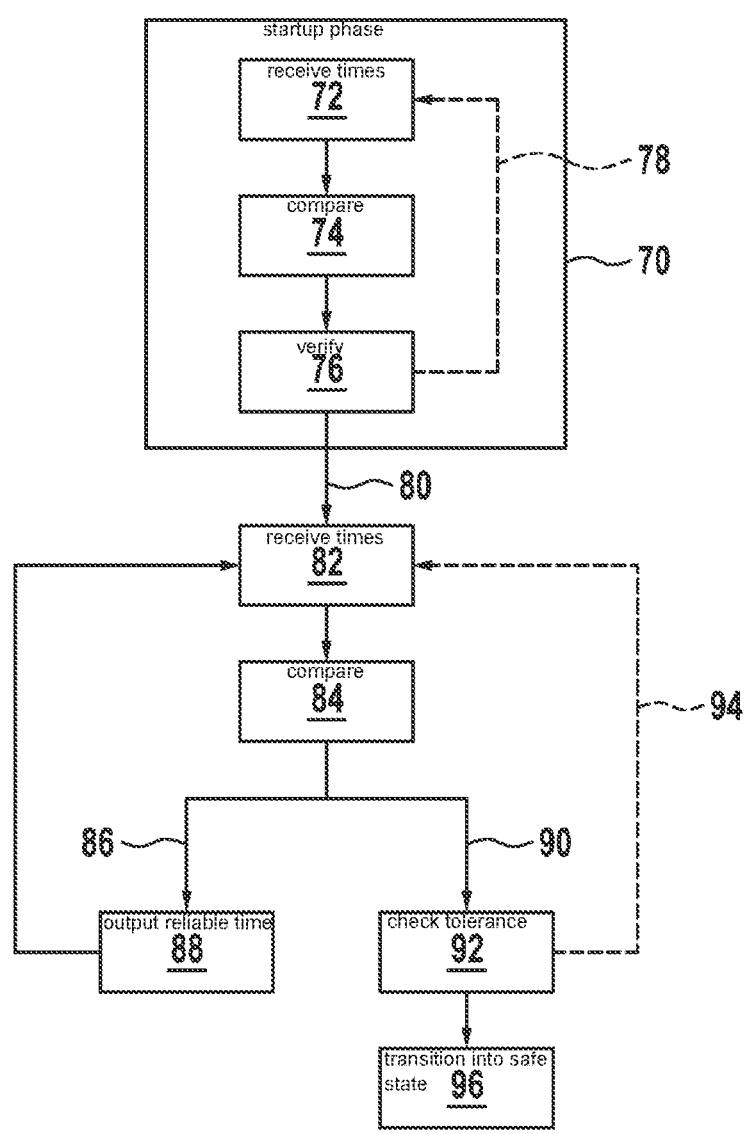
FIG. 3 shows a further possible sequence of the presented method in a flow diagram, according to the present invention.

FIG. 3 shows a further possible sequence of the method presented, with in particular optional steps being emphasized in this case.

During an optional startup phase 70, in a first step 72, times are received. These are compared with each other in a second step 74. Then in a third step 76 the times are verified multiple times, and it is checked whether they are stable. If this is not the case, the variant returns (arrow 78) to the first step 72. If this is the case (arrow 80), the startup phase 70 ends and the method continues with a fourth step 82.

In this fourth step 82, times are received. In a fifth step 84, these times are compared with each other. If the comparison is successful and the times are within the tolerance (arrow 86), then in a sixth step 88 a reliable time is output. If the comparison in the fifth step 84 fails, or if the times are outside of the tolerance (arrow 90), then in an optional seventh step 92 a tolerance time is checked. If this is not exceeded (arrow 94), then there is a return to the fourth step 82. If the tolerance time is exceeded, then in an eighth step 96 there is a transition into a safe state.

What is claimed is:

1. A method of operation of a vehicle, the method comprising the following steps:
  receiving over time, via one or more receivers of the vehicle, a plurality of instances of a pair of time signals that includes a first time signal from a first time source and a second time signal from a second time source, the first time source and the second time source being independent of each other;
  for each of the instances, comparing, by a hardware processing system of the vehicle, the first and second time signals with each other;
  while results of the comparisons are that the compared first and second time signals of the instances are within a predefined tolerance range of each other, operating, by the processing system, the vehicle in a normal mode in which safety operations are controlled by the processing system based on at least one of the first and second time signals of a most recent one of the received instances of the pair of time signals; and
  subsequently transitioning the vehicle to an error mode in which the safety operations are controlled by the processing system based on at least one of the first and second time signals of one of the instances of the pair of time signals that is not the most recent one of the received instances, wherein performance of the transitioning is triggered as a response to results of each of one of more of the comparisons being that there is, between the first and second time signals of the respective received pairs subject to the respective comparison, a deviation that is outside of the predefined tolerance range.

2. The method as recited in claim 1, wherein the vehicle includes an internally running clock that generates time values independently of the first and second time sources and according to which the processing system performs monitoring cycles in which respective ones of the comparisons are performed.

3. The method as recited in claim 1, wherein the first and second time signals have different formats than each other, and the method further comprises the processing unit harmonizing the first and second time signals into a common format.

4. The method as recited in claim 1, wherein a status signal is output dependent on the comparison and which indicates a degree of reliability of the first and second time signals.

5. The method as recited in claim 1, wherein the processing system is configured to detect that at least one of the first and second time sources has stopped indicating new times for a predefined amount of time.

6. The method as recited in claim 1, wherein at least one of the first and second time signals is a GPS signal or a UTC signal.

7. A vehicle comprising:
one or more receivers; and
a hardware processing system, wherein the processing system is configured to:
  receive over time, via the one or more receivers of the vehicle, a plurality of instances of a pair of time signals that includes a first time signal from a first time source and a second time signal from a second time source, the first time source and the second time source being independent of each other;
  for each of the instances, compare the first and second time signals with each other; while results of the comparisons are that the compared first and second time signals of the instances are within a predefined tolerance range of each other, operate the vehicle in a normal mode in which safety operations are controlled by the processing system based on at least one of the first and second time signals of a most recent one of the received instances of the pair of time signals; and
  in response to results of each of one of more of the comparisons being that there is, between the first and second time signals of the respective received pairs subject to the respective comparison, a deviation that is outside of the predefined tolerance range, transition the vehicle to an error mode in which the safety operations are controlled by the processing system based on at least one of the first and second time signals of one of the instances of the pair of time signals that is not the most recent one of the received instances.

8. The method as recited in claim 1, wherein the vehicle includes an internally running clock that generates time values independently of the first and second time sources and according to which the processing system determines that the deviation has been present for an amount of time that exceeds a predefined time period, with the transitioning being performed based on the exceedance of the predefined time period.

9. The method as recited in claim 1, further comprising, after a predetermined time period of the vehicle being in the error mode, transitioning the vehicle to a second error mode in which one or more of the safety operations are disabled.

10. The method as recited in claim 1, wherein the at least one of the first and second time signals on the basis of which the safety operations are controlled in the error mode is of a last one of the received instances in which the first and second time signals of the respective instance did not have a deviation outside of the predefined tolerance range.

11. A method of operation of a vehicle, the method comprising the following steps:
upon start-up of the vehicle, a hardware processor system of the vehicle operating the vehicle in a safe mode;
while the safe mode is active, performing, by the processor system, a cyclical time source monitoring, which includes a plurality of cycles that each includes:
  receiving, via one or more receivers of the vehicle, a first time signal from a first time source and a second time signal from a second time source, the first time source and the second time source being independent of each other;
  comparing the first and second time signals with each other; and
  determining, as a result of the comparison, that the first and second time signals are within a predefined tolerance range of each other; and
subsequently transitioning, by the processing vehicle, out of the safe mode to begin operation of the vehicle in a normal mode in which vehicle safety operations are performed according to at least one of the first and second time signals, wherein performance of the transitioning is triggered as a response to the plurality of cycles being consecutively performed with the respective determinations of the first and second time signals being within the predefined tolerance range of each other.

* * * * *